United States Patent
McDonnell

(10) Patent No.: US 11,197,482 B2
(45) Date of Patent: Dec. 14, 2021

(54) MEAT PROCESSING

(71) Applicant: DEVRONE UNLIMITED COMPANY, Ardee (IE)

(72) Inventor: Declan Arthur McDonnell, Blackrock (IE)

(73) Assignee: DEVRONE UNLIMITED COMPANY, Ardee (IE)

( * ) Notice: Subject to any disclaimer, the term of this patent is extended or adjusted under 35 U.S.C. 154(b) by 219 days.

(21) Appl. No.: 16/564,631

(22) Filed: Sep. 9, 2019

(65) Prior Publication Data

US 2019/0387756 A1    Dec. 26, 2019

Related U.S. Application Data

(63) Continuation of application No. 15/569,531, filed as application No. PCT/EP2016/054138 on Feb. 26, 2016, now Pat. No. 10,485,240.

(30) Foreign Application Priority Data

May 5, 2015    (IE) ..................................... 2015/0138

(51) Int. Cl.
| | | |
|---|---|---|
| A22B 7/00 | (2006.01) | |
| A22C 9/00 | (2006.01) | |
| A22B 5/00 | (2006.01) | |
| A22C 15/00 | (2006.01) | |

(52) U.S. Cl.
CPC ............ *A22B 7/002* (2013.01); *A22B 5/0076* (2013.01); *A22C 9/00* (2013.01); *A22C 15/003* (2013.01)

(58) Field of Classification Search
CPC .. A22B 7/00; A22B 7/002; A22B 5/00; A22B 9/00; A22B 15/00; A22B 15/003; A22B 17/02
USPC ......................................... 452/187, 141, 185
See application file for complete search history.

(56) References Cited

U.S. PATENT DOCUMENTS

| | | |
|---|---|---|
| 1,614,312 A | 1/1927 | Miller |
| 2,696,633 A | 12/1954 | Hincks |
| 3,579,716 A | 5/1971 | Stouffer et al. |
| 4,165,056 A | 8/1979 | Hilgner et al. |
| 4,376,326 A | 3/1983 | Noroy |

(Continued)

FOREIGN PATENT DOCUMENTS

| | | |
|---|---|---|
| CN | 203289020 U | 11/2013 |
| GB | 0340125 A | 12/1930 |

(Continued)

OTHER PUBLICATIONS

An Office Action issued by European Patent Office dated Jun. 8, 2020, which corresponds to European Patent Application No. 16 708 107.4 and is related to U.S. Appl. No. 16/564,631.

(Continued)

*Primary Examiner* — Richard T Price, Jr.

(74) *Attorney, Agent, or Firm* — Studebaker & Brackett PC

(57) ABSTRACT

A meat quality and yield improvement process comprises hanging the hind leg(s) of a carcass and applying an additional pulling force of from 50 to 500 kgf to the leg and back muscles of the carcass. The additional force stretches the muscle filaments of the leg and back muscles and is maintained until rigor is complete. The hind leg(s) of the carcass may be hung at an angle of 90 to 170 degrees to the vertical.

13 Claims, 11 Drawing Sheets

(56) References Cited

U.S. PATENT DOCUMENTS

| | | | |
|---|---|---|---|
| 4,380,849 | A | 4/1983 | Adkison et al. |
| 5,087,222 | A | 2/1992 | Sterling et al. |
| 5,180,328 | A | 1/1993 | Davis |
| 5,336,124 | A * | 8/1994 | Garside .................. A22B 5/161 452/125 |
| 5,405,290 | A | 4/1995 | Chuang |
| 2001/0034201 | A1 | 10/2001 | Bell et al. |
| 2003/0153258 | A1 * | 8/2003 | Hendrix .................. A22B 5/06 452/187 |
| 2019/0143001 | A1 * | 5/2019 | Lin .................. A61L 27/24 623/23.75 |

FOREIGN PATENT DOCUMENTS

| | | |
|---|---|---|
| GB | 1243605 A | 8/1971 |
| GB | 2079135 A | 1/1982 |
| GB | 2 386 822 A | 10/2003 |
| NL | 9 001 591 A | 2/1992 |

OTHER PUBLICATIONS

Ahnstrom et al.; "Pelvic suspension improves quality characteristics in M. semimembranosus from Swedish dual purpose young bulls"; Meat Science, 72 (2006), pp. 555-559.

Guzek et al.; "Relationships between sarcomere length and basic composition of infraspinatus and longissimus dorsi muscle"; Turkish Journal of Veterinary and Animal Sciences (2015) 39: 96-101.

"Meat Tenderness"; Texas A&M University, Jul. 9, 2015.

Wayne Anthony Gillis; "The Influence of Tension During Chilling on Pre-Rigor Excised Bovine Muscles"; Oklahoma State University MSc. Oct. 24, 1968.

Herring et al.; "Sarcomere Length of Free and Restrained Bovine Muscles at Low Temperature as Related to Tenderness"; J. Sci. FD Agric., vol. 16, Jul. 1965 (Jul. 1, 1965), pp. 379-384.

Tornberg; "Biophysical Aspects of Meat Tenderness"; Meat Science, Elsevier Science, GB, vol. 43, Jan. 1996 (Jan. 1, 1996), pp. 175-191.

Hostetler et al.; "Influence of Carcass Position During Rigor Mortis on Tenderness of Beef Muscles: Comparison of Two Treatments"; Journal of Animal Science, Jul. 1970 (Jul. 1, 1970), pp. 47-50.

Sorheim et al.; Muscle Stretching techniques for improving meat tenderness; Trends in Food Science & Technology; Apr. 2002; pp. 127-135; vol. 13.

Written Opinion issued in PCT/EP2016/054138; dated Aug. 17, 2016.

International Search Report issued in PCT/EP2016/054138; dated Aug. 17, 2016.

http://www.astrj.com/Comparison-of-sarcomere-length-for-two-types-of-meat-from-animal-family-suidae-analysis-of-measurements-carried-out-by-microscopic-technique, 142,0,2.html (Year: 2012).

* cited by examiner

MEAT PROCESSING

INTRODUCTION

The invention relates to a meat (e.g. bovine/ovine/porcine) improvement and conditioning processes. Improvement in this context refers to tenderness and/or succulence.

Our GB2386822A describes a meat improvement process in which the muscles of a carcass side are stretched by drawing the shank to an angle of between 160° and 145° from the vertical. The carcass side is then transferred to a chill chamber and conditioned in stages over a period of time.

The meat produced using this prior art system is improved in palatability.

There is however a need for an improved system in which tenderness and juiciness of meat is further enhanced.

STATEMENTS OF INVENTION

According to the invention there is provided a meat quality and yield improvement process comprising the steps of:—
hanging a carcass or a part thereof;
applying an additional pulling force of from 50 to 500 kgf to muscles of the carcass in order to stretch the muscle filaments; and
maintaining this force until rigor is complete.

In one case the additional pulling force applied is from 100 to 400 kgf. The additional pulling force applied in one case is from 200 to 400 kgf.

In one embodiment the pulling force is applied for a period of from 18 hrs to 168 hrs.

The pulling force may be applied for a period of from 18 hrs to 48 hrs. In one case the pulling force is applied for a period of about 48 hrs.

In one case the additional pulling force is applied to the leg and back muscles of a carcass.

The carcass may be hung by hanging the hind leg(s) of the carcass.

In one embodiment a carcass side is hung by hanging the hind leg of the carcass side.

In one embodiment the process comprises the step of hanging the hind leg(s) of the carcass at an angle of from 90 to 170 degrees to the vertical. The carcass may be hung at an angle of 145 to 165 degrees to the vertical.

In one embodiment the process comprises hanging the hind leg of a carcass side.

In one embodiment the process comprises the step of joining portions of the carcass with a contraction device and rigid connectors having sufficient tensile strength to apply/resist the additional pulling force applied.

The contraction device may be attached to the shank of a carcass and to a rib bone of the carcass via connectors.

In one case the contraction device is an elongate member a first end of which is attached to the shank of the carcass and a second end of which is attached to a rib bone of the carcass.

In one embodiment the second end of the elongate member is attached to the first rib bone of the carcass.

The contraction device may be adjustable in length.

In one case the contraction device comprises a ram having a cylinder and a rod, a hook at the end of the cylinder and a hook at the end of the rod, the ram being activated to apply a pulling force to the leg/back muscles of the carcass.

The ram in one case is adapted to apply, on retraction of the rod, a pulling force of about 150 kg.

In one embodiment the rod has a stroke length of from 150 to 250 mm. In one case the stroke length is about 160 mm.

In one embodiment the stretched carcass is subjected to a meat conditioning process comprising chilling a carcass in a first conditioning stage in which the carcass is maintained in air circulated at a temperature of from 10 to 12° C.

After the first conditioning stage the carcass may be further chilled in a second conditioning stage in which the carcass is maintained in air circulated at a temperature of from 4 to 6° C.

After the second conditioning stage the carcass may be further chilled in a third conditioning stage in which the carcass is maintained in air circulated at a temperature of from +2° C. to −1° C.

In one case the first conditioning stage takes place over a period of from 9 to 17 hours after stunning of the animal from which the carcass is produced.

In one case the second conditioning stage takes place over a period after the first conditioning stage of up to 24 hours after stunning.

In one case the third conditioning stage takes place over a period after the second conditioning stage of up to 90 days after stunning.

In one case the third conditioning stage takes place over a period after the second conditioning stage of up to 21 days after stunning.

In one embodiment air is circulated during the first conditioning stage at a speed of from 0.5 to 1.5 metres/second.

In one embodiment air is circulated during the second conditioning stage at a speed of from 0.3 to 1.0 metres/second.

In one embodiment air is circulated during the third conditioning stage at a speed of from 0.3 to 1.0 metres/second.

According to another aspect the invention provides apparatus for applying a pulling force to a carcass comprising an elongate contraction device and rigid connectors at ends of the contraction device, the device being adapted to apply a pulling force of from 50 to 500 kgf to muscles of a carcass.

In one embodiment the contraction device is adjustable in length.

In one case the contraction device comprises a ram. The ram may have a cylinder and a rod and the rigid connectors are provided at the ends of the rod and the cylinder.

In one embodiment the connectors comprise a first hook at the end of the cylinder and a second hook at the end of the rod.

In one case the ram is adapted to apply, on retraction of the rod, a pulling force of from 100 to 400 kgf.

In one case the ram is adapted to apply, on retention of the rod, a pulling force of from 100 to 200 kgf.

In one case the pulling force is about 150 kgf.

In one embodiment the rod has a stroke length of from 150 to 200 mm. In one case the rod has a stroke length of about 160 mm.

In another aspect the invention provides:
a meat conditioning process comprising the steps of:—
chilling a carcass in a first conditioning stage in which the carcass is maintained in air circulated at a temperature of from 10 to 12° C.,
after the first conditioning stage further chilling of the carcass in a second conditioning stage in which the carcass is maintained in air circulated at a temperature of from 4 to 6° C., and after the second conditioning stage further chilling of the carcass in a third conditioning stage in which the carcass is maintained in air circulated at a temperature of from +2° C. to −1° C., wherein:— the first conditioning stage takes place over a period of from 9 to 17 hours after stunning of the animal from which the carcass is produced;

the second conditioning stage takes place over a period after the first conditioning stage of up to 24 hours after stunning; and the third conditioning stage takes place over a period after the second conditioning stage of up to 90 days after stunning.

In one case air is circulated during the first conditioning stage at a speed of from 0.3 to 1.5 metres/second.

In one case air is circulated during the second conditioning stage at a speed of from 0.3 to 1.0 metres/second.

In one case air is circulated during the third conditioning stage at a speed of from 0.3 to 1.0 metres/second.

In another aspect the invention provides meat, especially post-rigor meat which has been tenderised, in which the muscle fibres are stretched to achieve a sarcomere length of greater than 2.6.

In one case the sarcomere length is up to 4 microns.

In one case the sarcomere length is up to 3.5 microns.

In one case the sarcomere length is from 3.0 to 3.2 microns.

In some embodiments the meat is bovine, ovine or porcine.

The meat in some cases may be leg and/or back muscle(s). In some cases the meat is a meat cut selected from one or more of sirloin, rump, topside, rib-eye, chuck and silverside.

In one embodiment the carcass is a beef carcass.

According to one aspect of the invention there is provided meat quality and yield improvement process comprising the steps of:— providing a carcass side;

hanging the hind leg of the carcass side at an angle of 90 to 170 degrees to the vertical; and applying an additional pulling force of from 100 to 400 kgf to the leg and back muscles of the carcass side in order to stretch the muscle filaments of the leg and back muscles; and maintaining this force until rigor is complete.

The carcass side is hung and the pulling force is applied before rigor mortis.

In one embodiment the carcass side is hung at an angle of 145 to 165 degrees to the vertical.

In one case the additional pulling force is from 100 to 200 kgf.

In one embodiment the process comprises the step of joining portions of the carcass side with a contraction device and rigid connectors having sufficient tensile strength to apply/resist the additional pulling force applied. The contraction device may be attached to the shank of the carcass side and to the first rib bone of the carcass side via connectors.

In one embodiment the contraction device is an elongate member one end of which is attached to the shank of the carcass side and the other end of which is attached to the first rib bone of the carcass side.

In one case the contraction device is adjustable in length.

In one embodiment the contraction device comprises a ram having a cylinder and a rod, a hook at the end of the cylinder and a hook at the end of the rod, the ram being activated to apply a pulling force to the leg/back muscles of the carcass side. The ram may be adapted to apply, on retraction of the rod, a pulling force of about 150 kg.

The rod may have a stroke length of about 150-250 mm, preferably about 160 mm.

In one embodiment the stretched carcass side is subjected to a meat conditioning process comprising chilling a carcass side in a first conditioning stage in which the carcass is maintained in air circulated at a temperature of from 10 to 12° C.

After the first conditioning stage the carcass side may be further chilled in a second conditioning stage in which the carcass is maintained in air circulated at a temperature of from 4 to 6° C. Immediately after the second conditioning stage the carcass side may be further chilled in a third conditioning stage in which the carcass is maintained in air circulated at a temperature of from +2° C. to −1° C.

In one embodiment the first conditioning stage takes place over a period of from 9 to 17 hours after stunning of the animal from which the carcass side is produced.

In one case the second conditioning stage takes place over a period after the first conditioning stage of up to 24 hours after stunning.

In one case the third conditioning stage takes place over a period after the second conditioning stage of up to 90 days after stunning.

In one case the third conditioning stage takes place over a period after the second conditioning stage of up to 21 days after stunning.

In one embodiment air is circulated during the first conditioning stage at a speed of from 0.5 to 1.5 metres/second. In one case air is circulated during the second conditioning stage at 0.3-1.0 m/s. In one case air is circulated during the third conditioning stage at 0.3-1.0 m/s.

The invention also provides apparatus for applying a pulling force to a carcass side comprising an elongate contraction device and rigid connectors at ends of the contraction device, the device being adapted to apply a pulling force of from 100 to 400 kgf to muscles of the carcass side.

In one embodiment the contraction device is adjustable in length.

In one case the contraction device comprises a ram. The ram may comprise a cylinder and a rod and the rigid connectors are provided at the ends of the rod and the cylinder.

In one embodiment the connectors comprise a first hook at the end of the cylinder and a second hook at the end of the rod.

The ram may be adapted to apply, on retraction of the rod, a pulling force of about 150 kgf.

The rod may have a stroke length of from 150 to 200 mm. The rod may have a stroke length of about 160 mm.

In another aspect the invention provides a meat conditioning process comprising the steps of:— chilling a carcass side in a first conditioning stage in which the carcass is maintained in air circulated at a temperature of from 10 to 12° C., after the first conditioning stage further chilling of the carcass side in a second conditioning stage in which the carcass is maintained in air circulated at a temperature of from 4 to 6° C., and immediately after the second conditioning stage further chilling of the carcass side in a third conditioning stage in which the carcass is maintained in air circulated at a temperature of from +2° C. to −1° C., wherein:— the first conditioning stage takes place over a period of from 9 to 17 hours after stunning of the animal from which the carcass side is produced;

the second conditioning stage takes place over a period after the first conditioning stage of up to 24 hours after stunning; and the third conditioning stage takes place over a period after the second conditioning stage of up to 90 days after stunning.

In one embodiment air is circulated during the first conditioning stage at a speed of from 0.5 to 1.5 metres/second. In one case air is circulated during the second conditioning stage at 0.3-1.0 m/s. In one case air is circulated during the third conditioning stage at 0.3-1.0 m/s.

The invention also provides tenderised meat in which the muscle fibres are stretched to achieve a sarcomere length of from greater than 2.6 and up to 4 microns, typically up to 3.5 microns, typically 3.0 to 3.2 microns.

BRIEF DESCRIPTION OF THE DRAWINGS

The invention will be more clearly understood from the following description thereof given by way of example only, in which:—

DETAILED DESCRIPTION

This method and apparatus of the invention optimizes the muscle temperature-pH conditions and degrees of muscle stretch to increase proteolysis and maximize sarcomere length and thus improve meat such as beef tenderness and juiciness.

Muscle proteolysis involves the ability of endogenous enzymes (e.g. calpains) to "breakdown" (termed "denaturation") muscle bonds which makes the meat more tender. The activity of these enzymes are highly dependent on the pH-temperature conditions within the meat.

The basic building block of striated muscle such as beef tissue consists of a series of muscle fibres. These fibres consist of a series of structures (called sarcomeres) arranged end on end. A sarcomere is a series of overlapping muscle filaments (called A and I bands). Stretching the muscle before the onset of rigor mortis (where cross links form to "fix" the bands in position) reduces the overlap between bands and reduces fiber diameter. This leads to a reduction in the energy required to shear the meat i.e. improved tenderness.

In addition, the chilling rate of the meat after exsanguination can induce muscle shortening either because it is too cold (cold shortening) or too warm (heat shortening).

Conventionally, beef sides are suspended from the achilles tendon. This hanging position leads to muscle stretch measurements (sarcomere length) of 1.7 microns. Other prior art hang carcasses from the tail region and lower the "leg" of the animal to angles between 90-160 degrees from the vertical axis. This can achieve sarcomere lengths in the region of 2.0-2.6 microns.

In contrast, in the invention stretching involves hanging the leg of the animal at an angle to the vertical but using the weight of the attached carcass and an external contraction device with rigid connectors to apply an additional pulling force of 50 to 500 kgf, typically 100 to 400 kgf, typically 100 to 200 kgf, preferably 130 to 170 kgf, preferably about 150 kgf onto the leg and back muscles. This is achieved by joining the carcass such as the shank in the case of beef, to a rib bone, preferably the $1^{st}$ rib bone with a connector/contraction device with suitable tensile strength to apply and transmit the force. This arrangement achieves a sarcomere length of greater than 2.6.

Figure 11:
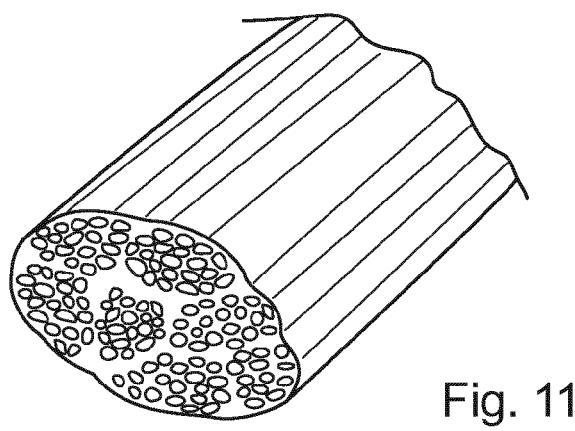
FIG. 11 is a cross section of muscle fibres in a relaxed condition.
Figure 12:
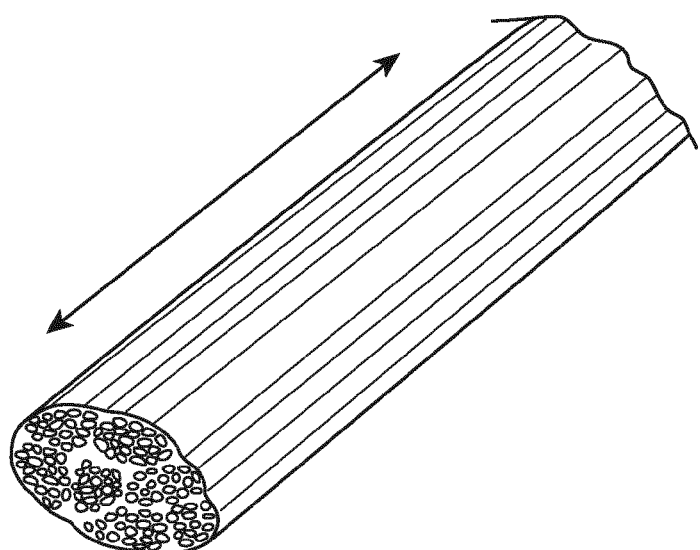
FIG. 12 is a cross sectional view showing the muscle fibres stretched.

In some cases the sarcomere length is up to 4 microns, typically up to 3.5 microns, typically of 3.0 to 3.2 microns with consequent improvement in tenderness, juiciness and reduced exudate loss from the muscle. The increase is sarcomere length is diagrammatically illustrated in FIGS. 11 and 12.

Sarcomere length of the post-rigor meat may be measured using laser diffraction techniques as outlined from example by Voyle C A [1971], Proc. $17^{th}$ Eur. Meeting, Meat Res. Work, Meat Research Institute, Langford, Bristol 95-97. The sarcomere length of a meat muscle or steak is an average of the sarcomere length of 10 samples of the meat muscle.

The invention may be applied to any suitable carcass such as bovine, ovine, or porcine. In the case of beef, the carcass is split into two sides and a carcass side is hung as described.

In some embodiments the hind legs of a carcass or a hind leg of a carcass side are hung at an angle of from 90 to 170, preferably 145 to 160 degrees to the vertical.

In the invention, portions of a pre-rigor carcass side 1 are joined with a connector that has sufficient tensile strength to resist the additional pulling force applied by the contraction device. In this case the connector comprises an elongate member 10 one end 11 of which is attached to the shank 12 of the side 1 and the other end 13 of which is attached underneath the first rib bone 14 of the carcass side 1. The connector is preferably adjustable in length to facilitate ergonomic attachment of the device to the carcass followed by subsequent contraction to bring the shank into correct orientation and under the prescribed tension.

Figure 1:
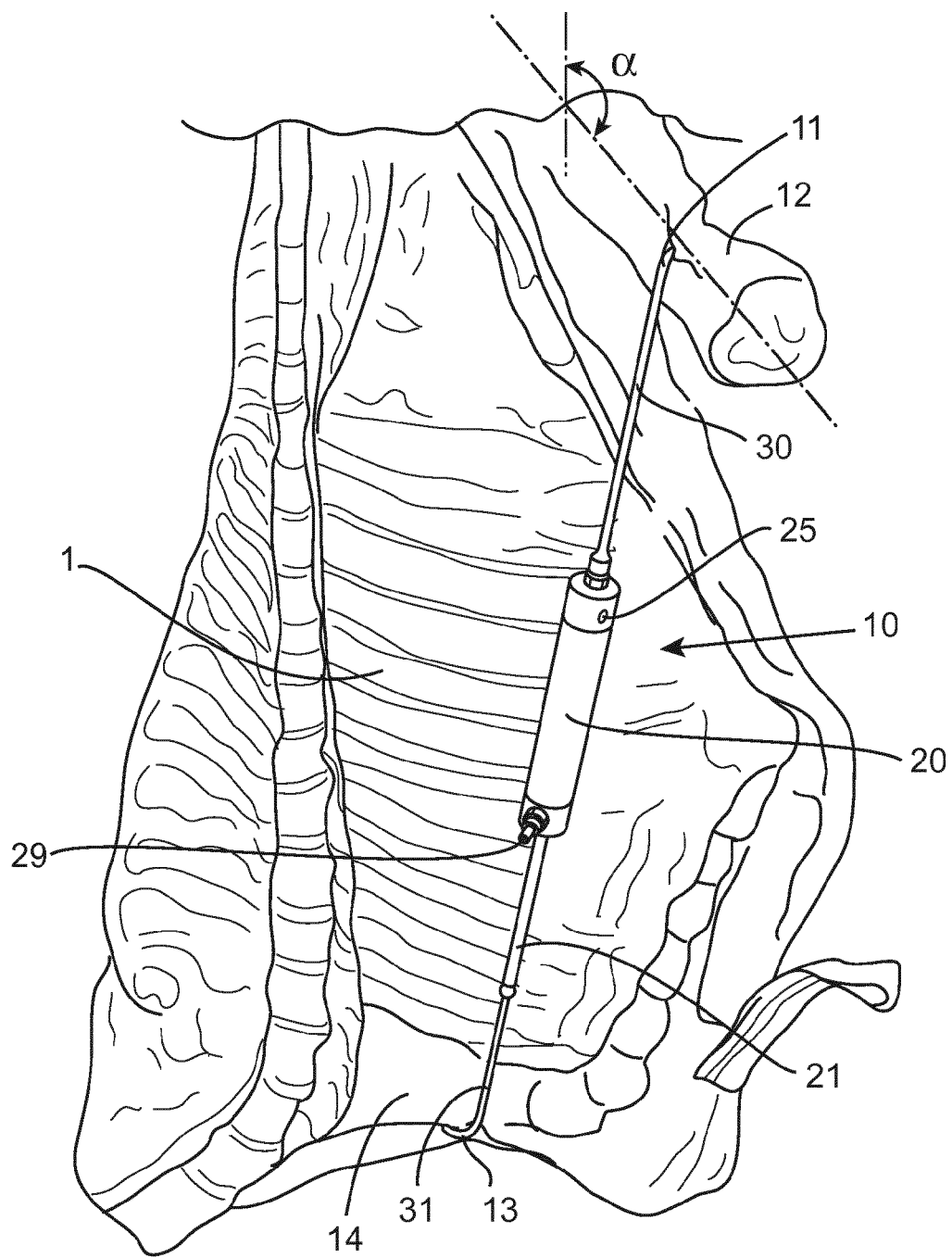
FIG. 1 is a view of a carcass side in which additional pulling force is applied.
Figure 2:
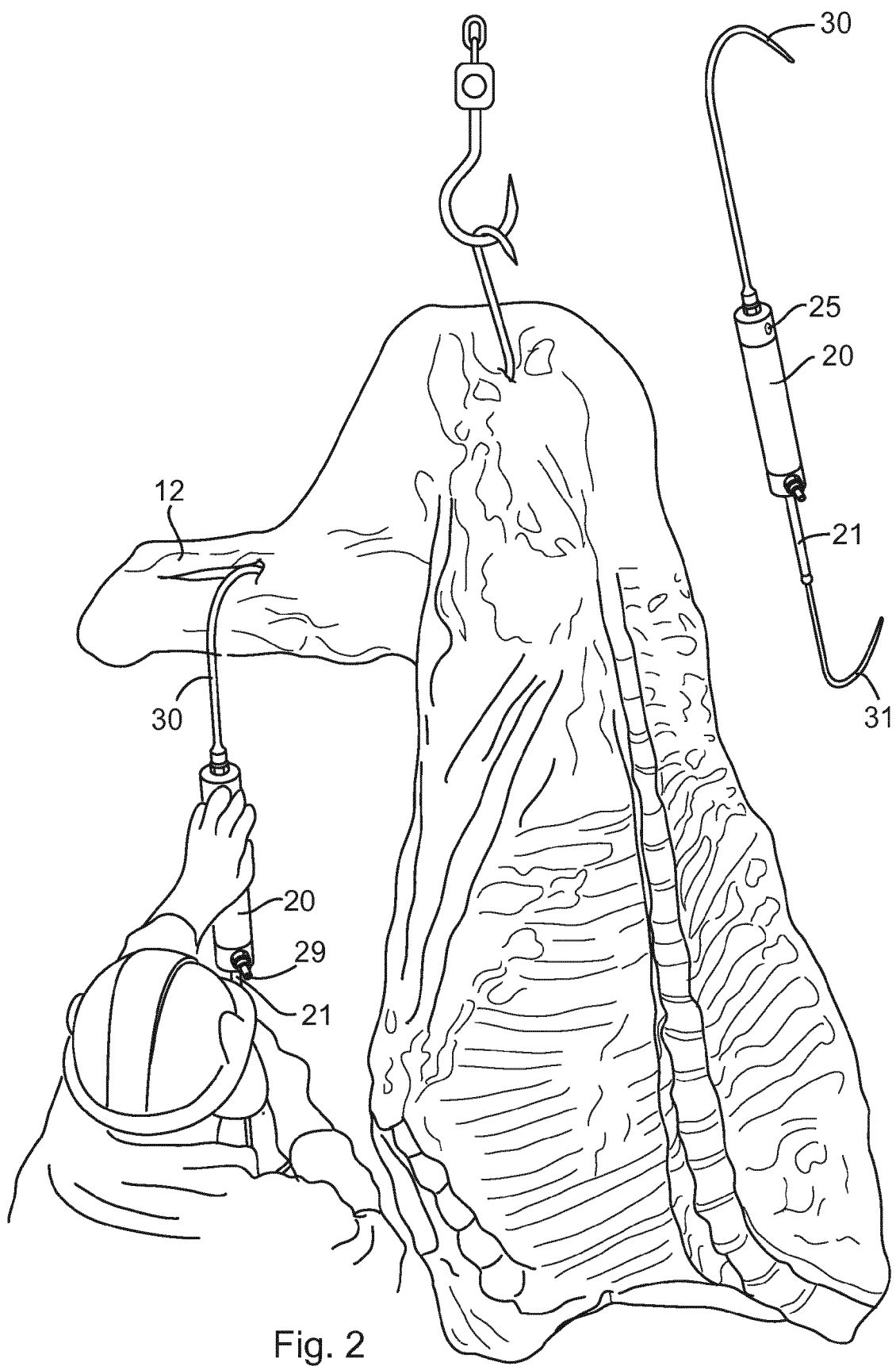
FIGS. 2 and 3 are views illustrating the application of pulling force.
Figure 3:
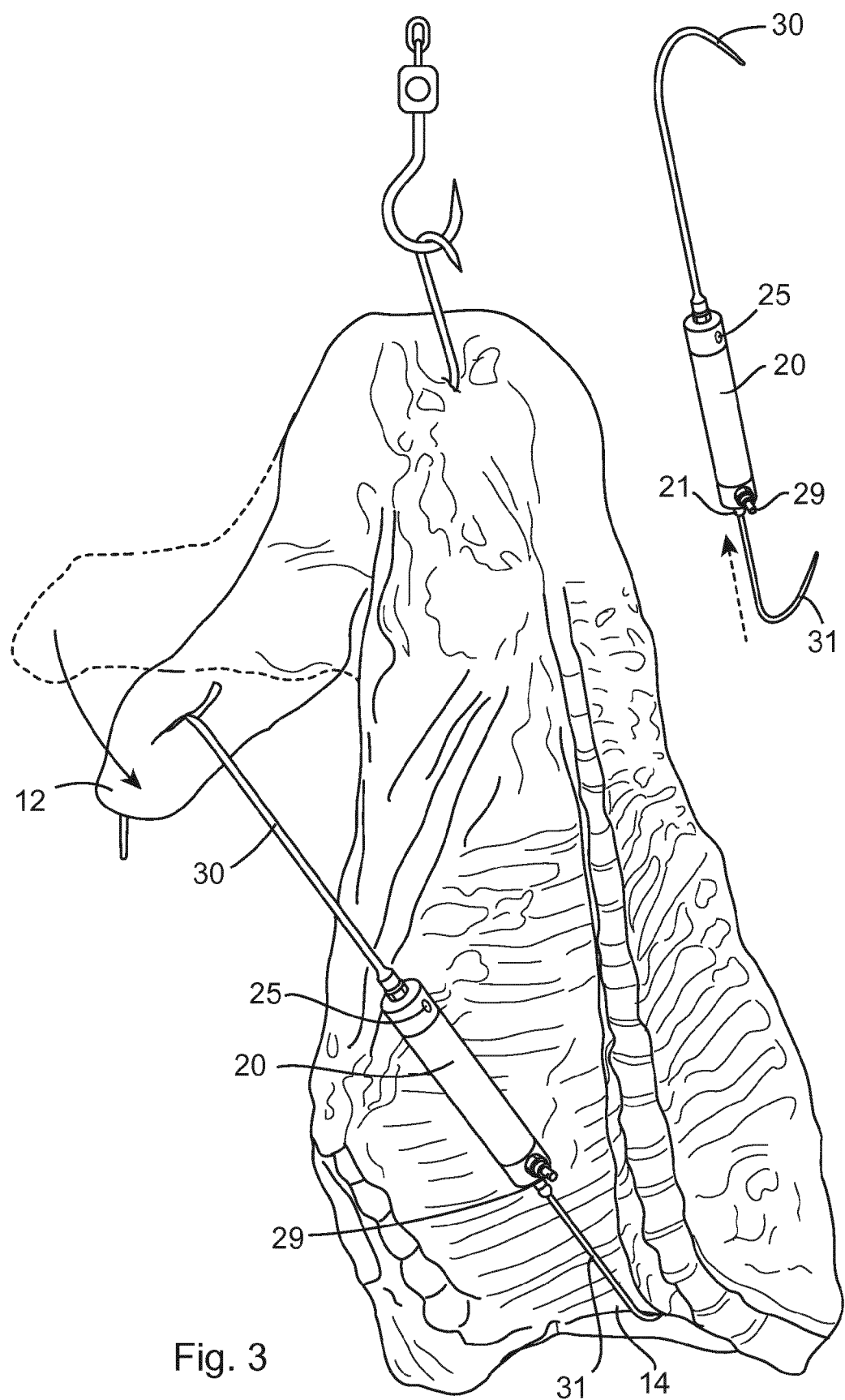
Figure 4:
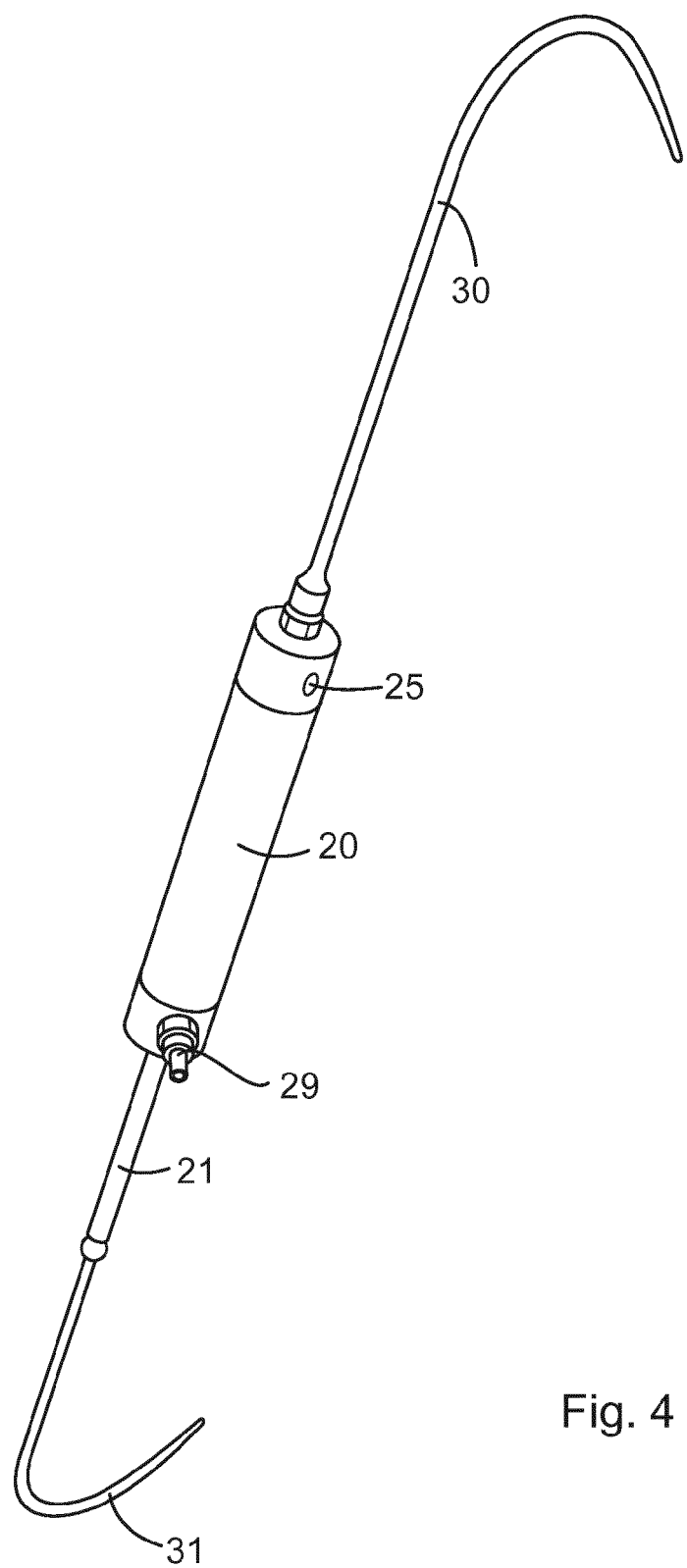
FIG. 4 is a perspective view of a contraction device used in the invention.
Figures 5, 6:
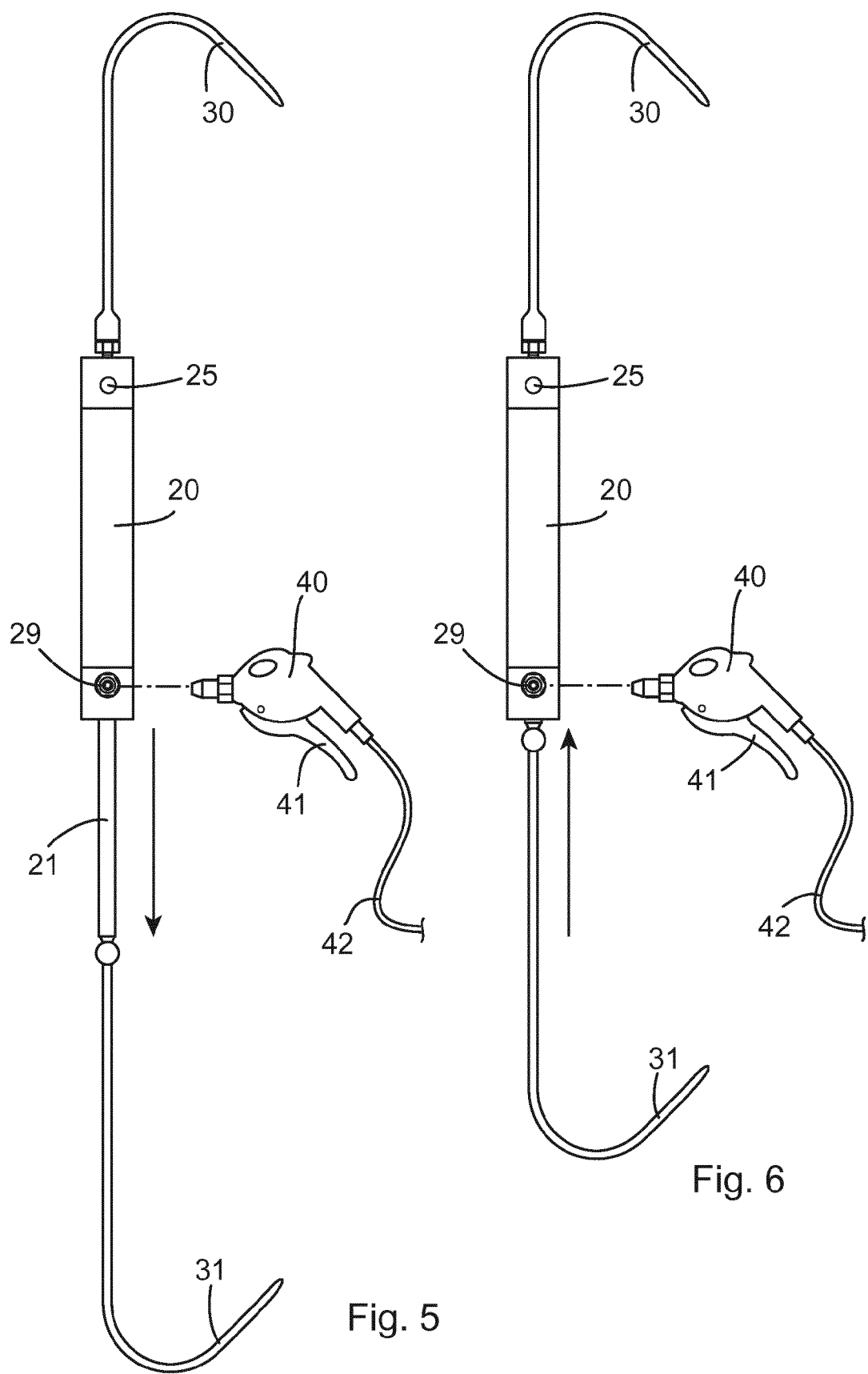
FIG. 5 is a view of the contraction device in an extended release configuration.
FIG. 6 is a view of the contraction device in a retracted contracting configuration.
Figure 7:
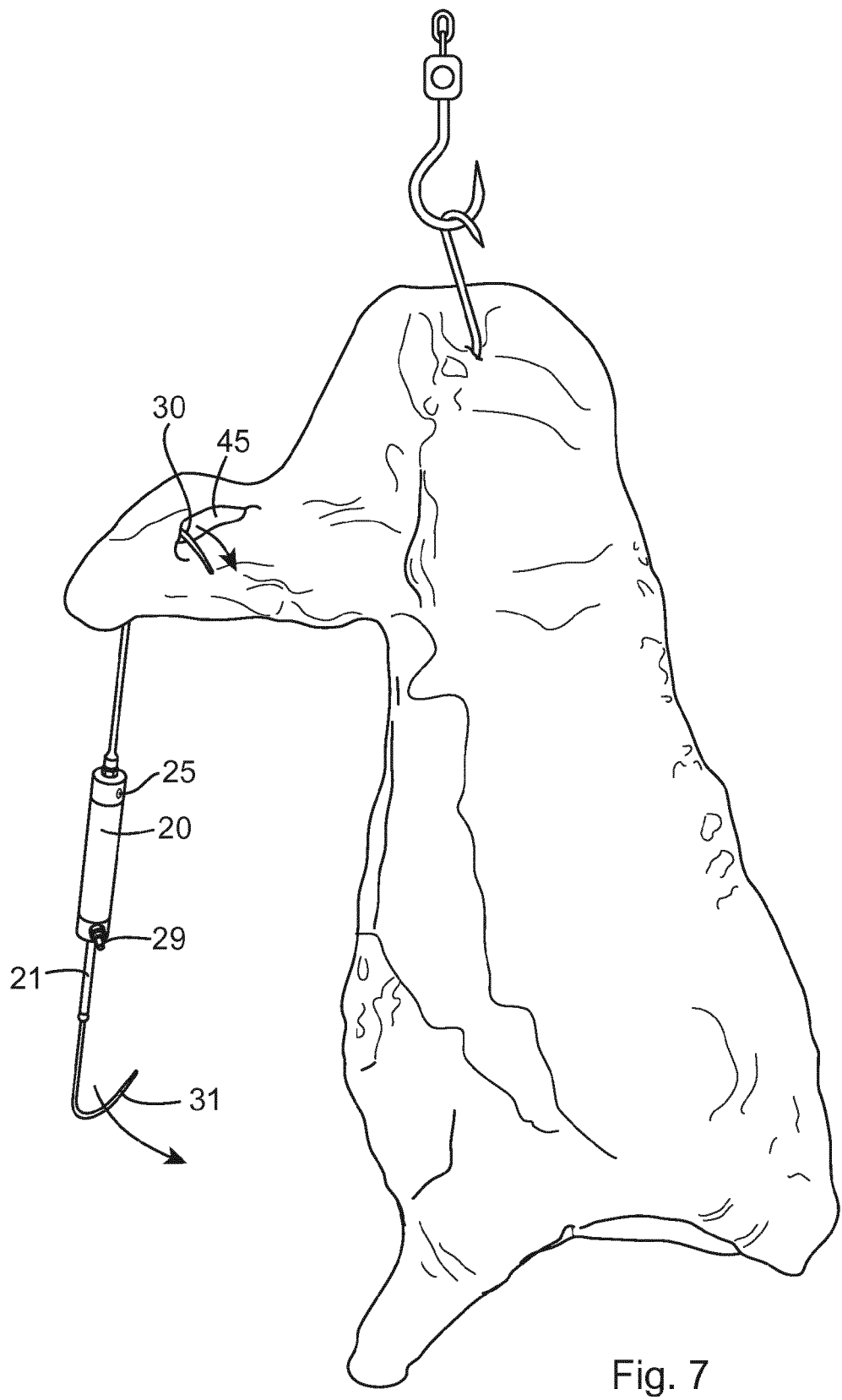
FIGS. 7 and 8 illustrate the mounting of the contraction device to a carcass side.

The connector in this case comprises a ram having a cylinder 20 and a rod 21. The ram is operated by pressurised air which is delivered through an inlet port 29 and exhausted through an outlet 25. A first hook 30 is mounted to the end of the cylinder 20 and a second hook 31 is mounted at the end of the rod 21. In a release position (FIG. 2) the rod 21 extends from the cylinder. The operator can readily attach to the shank 12 using the hook 30 and to the first rib 14 using the hook 31 (FIG. 3). The ram is then activated by pressurised air to apply a retracting force to the rod 21 which pulls the shank 12 down and applies a pulling force to the leg and back muscles of the carcass side. The ram is configured or adapted to apply a pulling force of about 150 kg. The pulling force is applied for a period of 18 hrs to 168 hrs, preferably 18 hrs to 48 hrs, usually approximately 48 hrs.

The additional force applied by the ram may be measured using a strain gauge. For example, a strain gauge may be interposed between the ram and the hook 30 which is attached to the shank of the carcass.

The ram typically has a stroke length of about 150 to 250 mm (preferably about 160 mm) and the cylinder diameter is about 60 mm. It is fitted with a quick release pressurisation/de-pressurisation valve. The pressure is 6-16 bar gauge.

Figure 8:
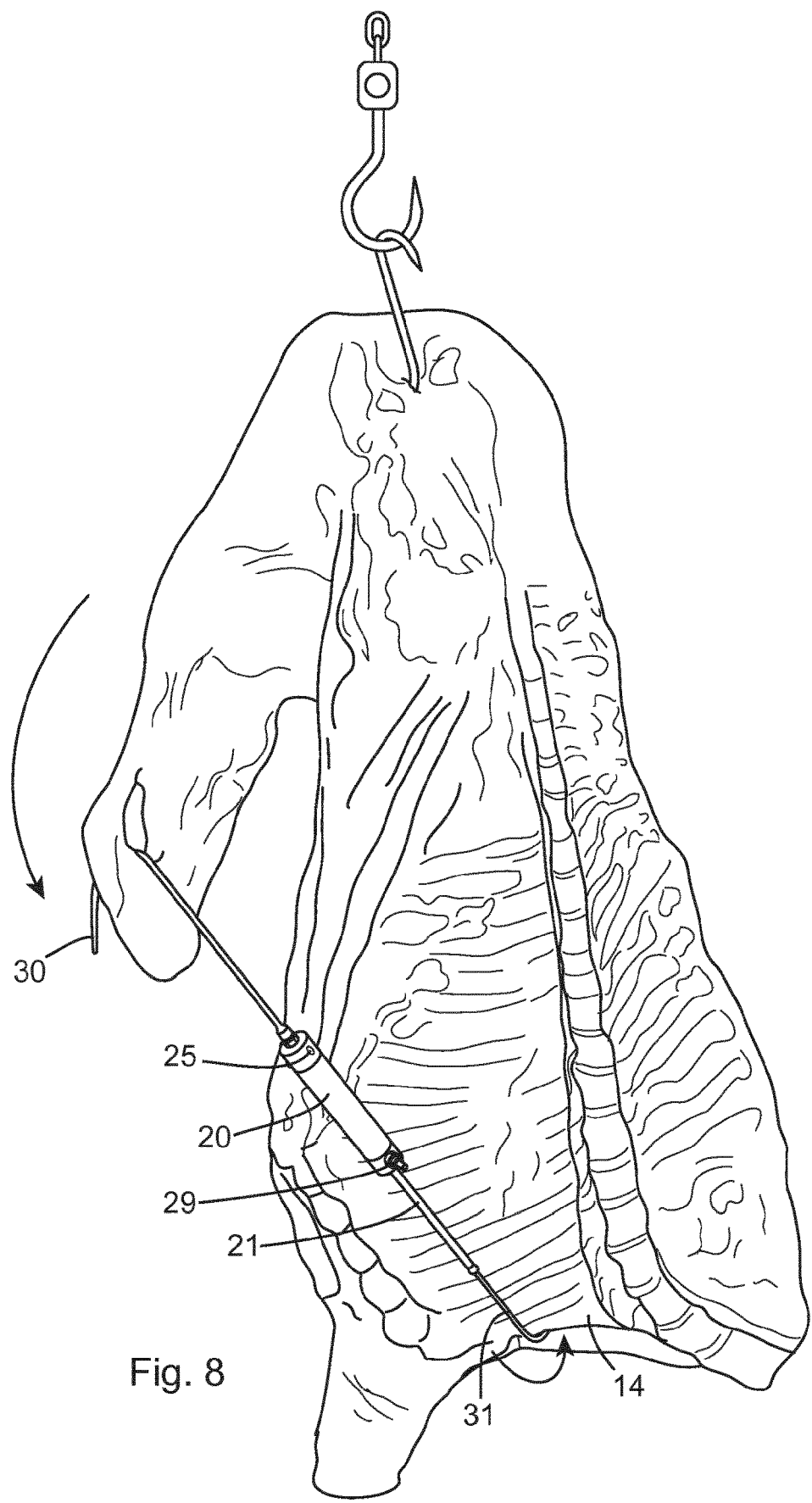
Figure 9:
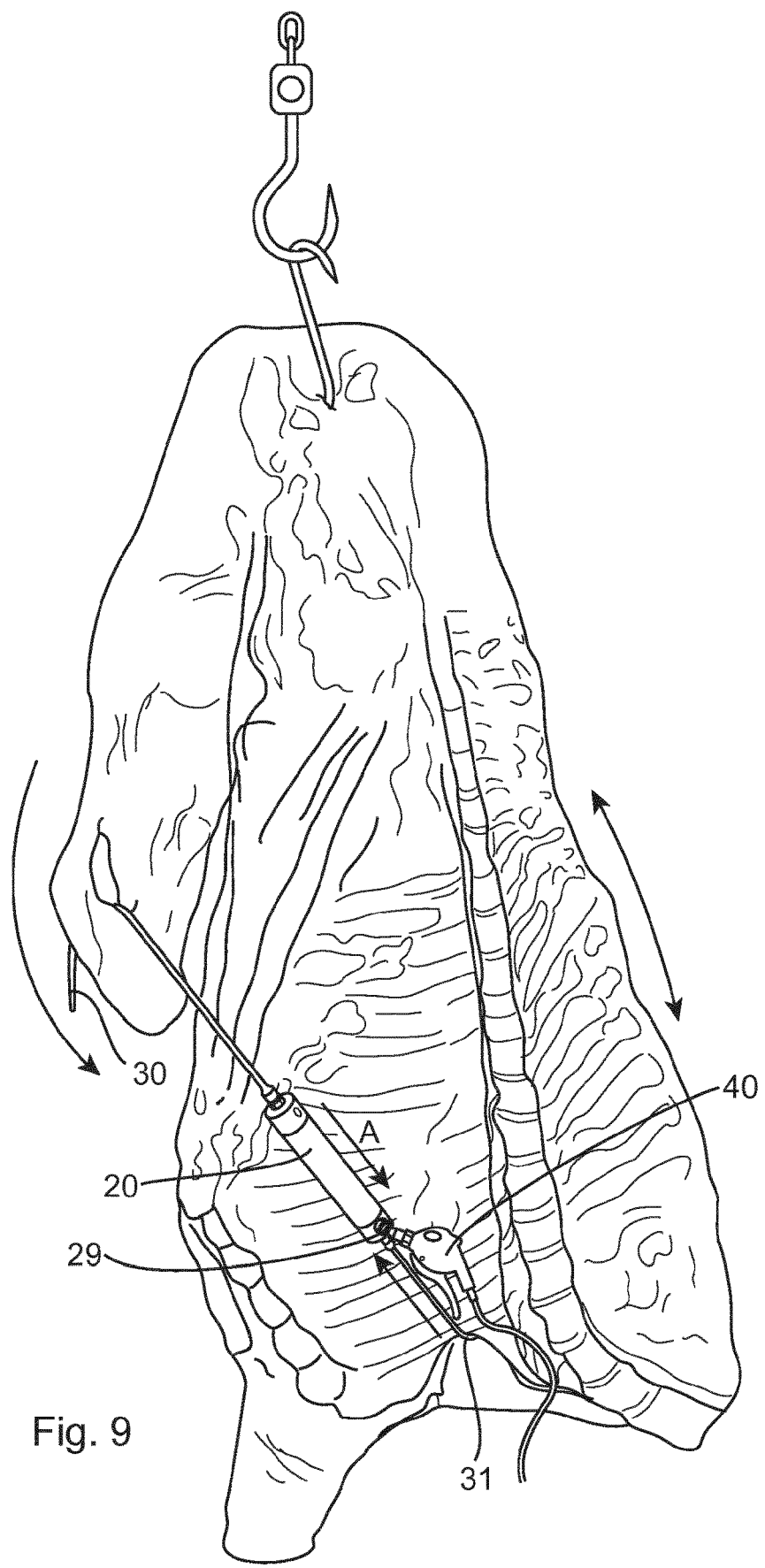
FIG. 9 illustrates the retraction of the contraction device to apply a pulling force.
Figure 10:
FIG. 10 illustrates the release of the contraction device to release the pulling force.

Referring to FIGS. 4 to 10 a contraction device and a method for applying a pulling force are illustrated in further detail. In this case the ram has a port 29 fitted with a quick release valve which is operated by an actuator 40 which has a trigger 41 for manual activation by an operator. The rod 21 of the ram is extended (FIG. 5) by engaging the actuator 40 with the port 29 and activating the trigger 41 which causes pressurised air to be delivered from a pipe 42 into the ram. The rod 21 of the ram is retracted (FIG. 6) by engaging the actuator 40 with the port 29. In this case pressurised air is released from the ram through the outlet 25 and the rod 21 retracts. In a first step (FIG. 7) the hook 30 is engaged in an open slot 45 in the shank of the carcass leg. In this configuration the rod 21 is in an extended configuration. This means that the operator does not have to apply significant force when attaching the hook 31 to the first rib 14 of the carcass (FIG. 8). During this first step the leg is pulled down a small distance only. When the hooks 30, 31 are in place the operator then attaches the activator 40 to the port 29 and activates the trigger to cause the rod 21 to retract into the cylinder and thereby apply a pulling force which pulls the leg downwardly (FIG. 9) as described above. The activator 40 is removed and the pulling force is applied for a period of time. An operator then attaches the activator 40 to the port 29 and activates the trigger which releases pressurised air and causes the rod 21 to extend (FIG. 10), allowing the contraction device to be readily removed. The contraction device is then ready for use on another carcass.

The force of contraction is illustrated by a contraction arrow A or vector which runs parallel to the longitudinal axis of the cylindrical body in the contracted state. The force may be measured by attaching a spring balance to the cylinder during contraction. The force applied is in a fixed mathematical relationship to air pressure and cylinder diameter.

The contraction device preferably comprises a ram for ease of use and efficiency. However, other types of contraction devices may be used such as a lockable spring or rack and pinion mechanical devices.

Some of the meat cuts may be released from the carcass prior to stretching. The cuts such as top flank may be released by severing most, but not all, of the contact of the muscle with surrounding tissue so as to improve air circulation around the meat which can be somewhat disimproved by lowering the shank as described.

In the invention the benefits of enhanced muscle stretch above are maintained by controlled chilling of the carcass to minimize muscle contraction due to "heat shortening", "cold shortening" and "rigor shortening". This is achieved by the following precise air chill regime.

Stage 1 Conditioning: +10 to +12° C. air temperature: for a period of 9-17 hrs post stunning. Air Speed: 0.5-1.5 m/s.

Stage 2 Conditioning: +4 to +6° C. air temperature: for a period 24 hrs from stunning of $1^{st}$ animal in the production batch (such as a chiller batch). Air Speed: 0.3-1.0 m/s.

Stage 3 Conditioning: +2 to −1° C. air temperature: for a period immediately succeeding the end of Stage 2 Conditioning up to 90 days from stunning of a given animal. Air Speed: 0.3-1.0 m/s.

Figure 13:
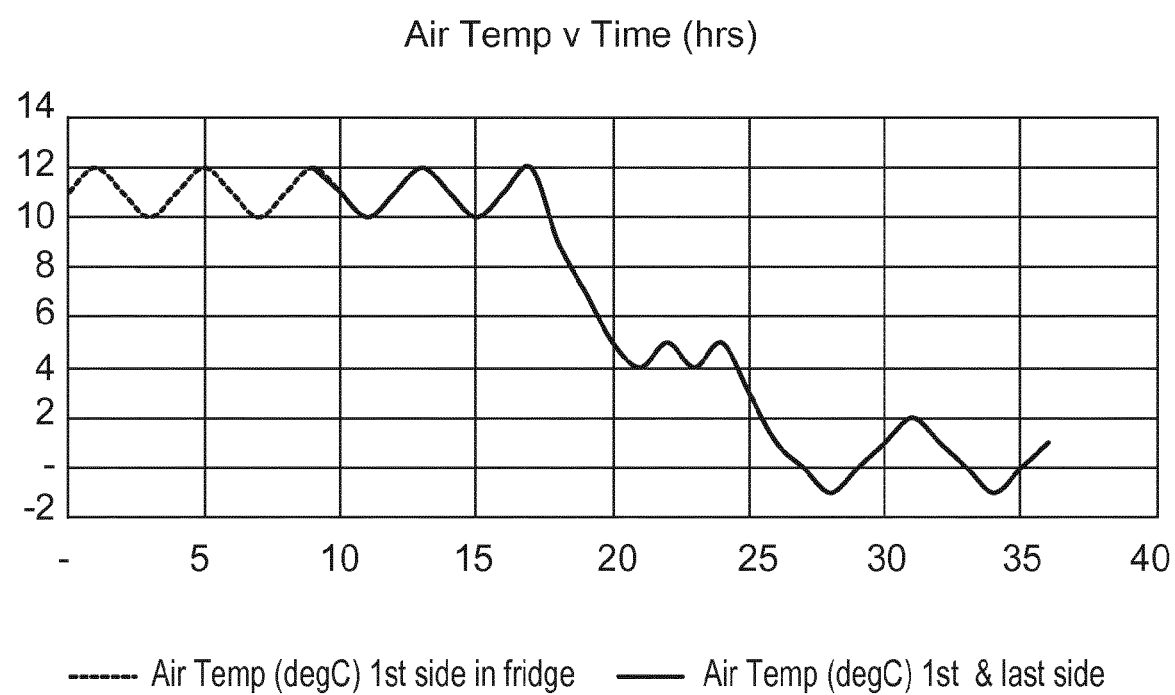
FIG. 13 is a graph of chilling temperature over time.

The staged conditioning is diagrammatically illustrated in FIG. 13.

The relative humidity may be controlled in the range 0% to 98% during any of the conditioning stages. In particular, during the third conditioning stage the relative humidity may be maintained below 50%.

This chill regime complements the carcass types processed (weight, gender, muscle depth, fat cover and metabolic rate).

The tissue is maintained in the stretched condition until rigor mortis and isometric tension are completely resolved. The quarters are not re-suspended from the achilles tendon or removed from the carcass skeleton until a minimum of 48 hrs post stunning at which point the fillet is loosened from the side (to prevent tearing), the side is re-suspended from the Achilles tendon and the meat is removed from the skeleton during deboning.

The system provides improved tenderness, juiciness, and overall palatability of meat cuts while reducing exudate from prolonged vacuum storage. In the invention the maturation time to mature beef cuts can be reduced leading to reduced weight losses in storage and storage time. The meat also has colour stability and bacteriological levels due to this accelerated maturation.

The system also ensures that all animals achieve a sarcomere length of greater than 3.0 microns in the major back and leg cuts (sirloin, rump, topside, rib-eye, chuck and silverside) even though animals glycolyze at different rates and hence can be at different degrees of rigor (i.e. stiffness) at the end of the kill line. The 150 kgf is sufficient to accommodate any degree of stiffness and to stretch the muscle. This reduces variation in palatability between animals.

In the invention the muscle fibres of the tenderised meat are stretched to achieve a longer sarcomere length. Meat is tenderised whilst minimising exudate loss under vacuum pack storage. The meat muscles are stretched in a labour friendly, ergonomic manner in which an operator is not being required to apply significant manual force.

It will be appreciated that whilst some of the drawings illustrate cattle carcass processing the invention may be applied to any suitable animal, especially bovine, ovine or porcine. The pulling device may be attached to any suitable points of attachment of a particular carcass or part thereof.

The invention is not limited to the embodiments hereinbefore described which may be varied in detail.

The invention claimed is:

1. Apparatus for applying a pulling force to a carcass comprising an elongate contraction device and rigid connectors at ends of the contraction device, wherein:
   the contraction device comprises a ram comprising a cylinder, a rod, and rigid connectors at the ends of the cylinder and the rod,
   the connectors comprise a first hook at the end of the cylinder and a second hook at the end of the rod,
   said hooks are configured for attachment to a shank and a rib bone of a carcass,
   the rod has a stroke length of from 150 mm to 200 mm, and
   the ram is adapted to apply a pulling force of from 50 kgf to 400 kgf to muscles of a carcass.

2. The apparatus as claimed in claim 1, wherein the ram is adapted to apply, on retention of the rod, a pulling force of from 100 kgf to 200 kgf.

3. The apparatus as claimed in claim 1, wherein the ram is adapted to apply, on retention of the rod, a pulling force of 150 kgf.

4. The apparatus as claimed in claim 1, wherein the rod has a stroke length the rod has a stroke length of from 150 mm to 200 mm.

5. Use of an apparatus comprising an elongate contraction device and rigid connectors at ends of the contraction device, wherein:

the contraction device comprises a ram comprising a cylinder, a rod, and rigid connectors at the ends of the cylinder and the rod, the connectors comprise a first hook at the end of the cylinder and a second hook at the end of the rod, said hooks are configured for attachment to a shank and a rib bone of a carcass, the ram is adapted to apply a pulling force of from 50 kgf to 400 kgf, the method being to perform a meat quality and yield improvement process comprising the steps of:

hanging a carcass or a part thereof;

joining portions of the carcass with the apparatus and applying an additional pulling force of from 50 kgf to 500 kgf to muscles of the carcass in order to stretch the muscle filaments; and maintaining this force until rigor is complete.

6. The use as claimed in claim 5, wherein the additional pulling force applied is from 100 kgf to 400 kgf.

7. The use as claimed in claim 5, wherein the additional pulling force applied is from 200 kgf to 400 kgf.

8. The use as claimed in claim 5, wherein the pulling force is applied for a period of from 18 hrs to 168 hrs.

9. The use as claimed in claim 5, wherein the pulling force is applied for a period of from 18 hrs to 48 hrs.

10. The use as claimed in claim 5, wherein the pulling force is applied for a period of about 48 hrs.

11. The use as claimed in claim 5, wherein the additional pulling force is applied to the leg and back muscles of a carcass.

12. The use as claimed in claim 5, wherein the carcass is hung by hanging one or both of the hind legs of the carcass.

13. The use as claimed in claim 5, further comprising the step of hanging one or both of the hind legs of the carcass at an angle of from 145° to 165° to the vertical.

\* \* \* \* \*